United States Patent Office 2,953,435
Patented Sept. 20, 1960

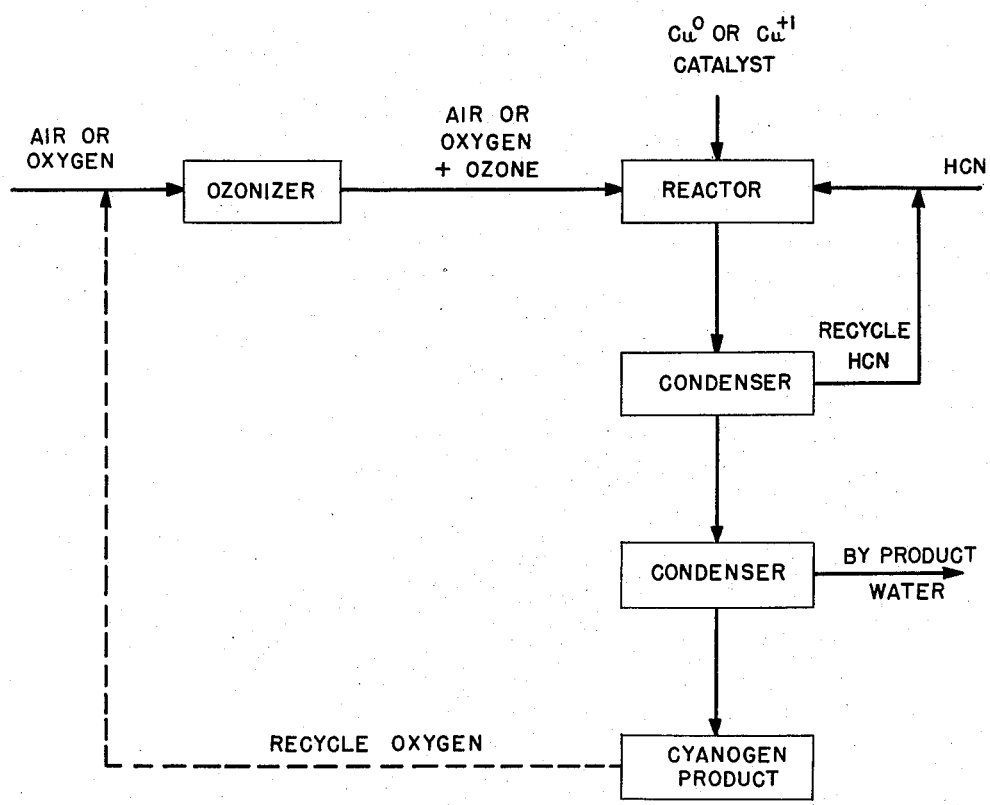
PRODUCTION OF CYANOGEN
INVENTORS
WILLIAM L. FIERCE
BY  WALTER J. SANDNER
ATTORNEY

2,953,435
METHOD OF PREPARING CYANOGEN

William L. Fierce, Crystal Lake, and Walter J. Sandner, Carpentersville, Ill., assignors to The Pure Oil Company, Chicago, Ill., a corporation of Ohio Filed Dec. 12, 1958, Ser. No. 780,127

10 Claims. (Cl. 23—151)

This invention relates to the preparation of cyanogen. More particularly, this invention relates to a process for the conversion of hydrocyanic acid or hydrogen cyanide by oxidation with ozone into cyanogen.

Cyanogen also known as ethane dinitrile, dicyanogen and oxalonitrile, is a colorless and extremely physiologically toxic gas of high stability having utilization in a number of chemical syntheses and other chemical reactions, notably in the preparation of nitriles. Cyanogen was first prepared by Gay-Lussac in 1815 but has not been manufactured in the past on a large scale and has not found wide usage despite its valuable properties, such as its fungicidal nature, because the methods for its preparation are relatively expensive.

Cyanogen has been prepared in the past by dehydration of ammonium oxalate or oxamide with phosphorous pentoxide; by the treatment of sodium or potassium cyanide with copper sulfate; by heating mercuric cyanide, silver cyanide or auric cyanide; and by the dehydration of glyoxime with acetic anhydride. A newer method of producing cyanogen comprises reacting hydrogen cyanide with chlorine gas, with the evolution of hydrogen chloride and cyanogen. Elevated temperatures of about 200-1000° C. are necessary for this reaction. The production of cyanogen by oxidation of hydrogen cyanide with manganese dioxide at 200° C. and above has also been reported. The prior art methods above-described are characterized by requiring complex reagents and/or involving special operating conditions of temperature and/or pressure. Where strong oxidizing agents are used such as manganese dioxide, potassium permanganate, chlorine and the like, elevated temperatures are frequently required and undesirable by-products are frequently formed. Thus, for example, oxidation with potassium permanganate causes reduction of the permanganate and formation of manganous ions in the reaction solution. The manganous ions must be removed if the process is to be continuous; this is time-consuming, and in the case of other, similar oxidizing agents, is sometimes difficult. Moreover, yields of cyanogen obtained from hydrogen cyanide or hydrocyanic acid by prior art methods are in general quite low. Another drawback with the common oxidizing agents is that the reaction usually must be carried out in an aqueous environment or under other fixed or limited conditions.

Therefore, an object of this invention is to provide a flexible process whereby cyanogen may be economically prepared from hydrocyanic acid or hydrogen cyanide. A still further object is to prepare cyanogen from hydrogen cyanide by oxidation with an ozone-containing agent. Yet another object is to provide a simple and efficient method of preparing cyanogen in high yields without the use of elevated temperatures or pressures. Still another object of this invention is to oxidize hydrogen cyanide or hydrocyanic acid in gaseous, liquid or aqueous form with ozone in the presence of copper metal or cuprous compounds as catalyst at temperatures of —14° to +150° C.

We have found that when hydrogen cyanide or hydrocyanic acid is reacted with an ozone-containing agent in gaseous phase, in liquid phase (liquid hydrogen cyanide), or in an aqueous system, high yields of cyanogen are obtained without the substantial production of interfering or otherwise deleterious by-products. By-products obtained during operation of the process comprise water and oxygen, both of which can be easily disposed of during a continuously running operation and neither of which interferes with the progress of the reaction process. Moreover, products such as paracyanogen, $(CN)_x$, are not formed in any substantial amount. Paracyanogen, an undesirable by-product of some cyanogen-generating reactions, is a brown, amorphous compound which sublimes upon heating. Once formed, paracyanogen is not readily dissociated into the commercially valuable cyanogen. It has been found, rather, that continuous heating converts cyanogen into paracyanogen. In the production of cyanogen from hydrogen cyanide or hydrocyanic acid by reaction with ozone, the equation probably is as follows:

$$2HCN + O_3 \xrightarrow{\text{catalyst}} (CN)_2 + H_2O + O_2$$

In the accompanying drawing, there is shown a flow diagram of our process illustrating the preparation of cyanogen by reaction of hydrogen cyanide with ozone in the presence of metallic copper or cuprous compounds as catalysts. In our process, oxygen in pure or diluted form, e.g., air, is passed through an ozonizer of conventional construction. The ozonizer may be of any suitable size, shape, and construction, and is preferably kept at a temperature just below room temperature. From the ozonizer, the effluent which contains up to about 5% v. of ozone is passed into a reactor to contact the hydrogen cyanide for oxidation thereof. The reactor may be of any suitable size and shape and may contain hydrogen cyanide as a gas or liquid, or in solution in water or aqueous mineral acid. When aqueous solutions are used, the mol ratio of hydrogen cyanide to water may vary widely, as, for example, 1:1–10, but preferably 1:2–3. When liquid hydrogen cyanide or hydrogen cyanide solution is used as reactant, the ozone-containing gas is bubbled through the liquid at a number of points. The catalyst, which may be metallic copper or any cuprous compound, is present in the reactor in the form of pellets or as a slurry. The temperature of the system may be regulated by any suitable arrangement of heating or cooling coils or the like. Cyanogen is produced by oxidation of the hydrogen cyanide and passes from the reactor with by-product water and some unreacted hydrogen cyanide to condensers where hydrogen cyanide is condensed and recycled and by-product water is removed. Finally, the cyanogen is condensed and purified by redistillation. Oxygen may be recycled from the reactor or from the condenser to the ozonizer, if desired. In the reactor, there may be provided any suitable gas-liquid contacting arrangement, such as a power-driven agitator or an arrangement of trays providing a means for countercurrent flow of hydrogen cyanide and the ozone-containing gas.

When the reaction is carried out in the gas phase, hydrogen cyanide is passed in the gaseous state into the reactor and mixed with the ozone-containing gas in contact with the catalyst in the reactor. Reaction effluent is withdrawn from the reactor and the unreacted hydrogen cyanide, by-product water, and cyanogen separately condensed. The unreacted hydrogen cyanide may be recycled to the reactor if desired. In this reaction, the reactants are fed at atmospheric pressure and temperatures varying from —14° C. (melting point of HCN) to +150° C. The reaction temperature is not critical within this range except that some of the hydrogen cyanide is oxidized to carbon dioxide at the upper end of the temperature range when more active catalysts are used. With the catalysts used in this process, it is not practical to carry out the reaction of hydrogen cyanide and ozone at temperatures in excess of about 150° C. since the hydrogen cyanide is oxidized almost entirely to carbon dioxide at these higher temperatures. The reaction time for this process is not critical although it is preferred that the reactants be circulated at gaseous hourly space velocities of the order of 0.01–10.0.

The scope of our invention is further illustrated by the following nonlimiting examples:

*Example I*

Oxygen containing approximately 3.5% ozone is bubbled through 65 ml. of liquid hydrogen cyanide at 0° C. and at a gas flow rate at about 10 liters per hour in a glass flask containing 0.5 g. of $Cu_2CN_2$. The effluent gases are collected at intervals and analyzed for cyanogen using the mass spectrometer. Gas samples after about 15 minutes contain less than 0.01% cyanogen; samples after 105 minutes contain less than 0.04% cyanogen. After about 210 minutes, the gas samples contain 0.83% cyanogen, representing a yield of 40–50% based on the ozone input.

*Example II*

Oxygen containing about 3% ozone is passed at 10 liters per hour flow rate, at 20° C., through a solution formed from 50 ml. liquid hydrogen cyanide and 200 ml. of 3 N $H_2SO_4$, containing 0.5 g. $Cu_2O$. The effluent gases after 15 and 72 minutes contain 0.45% and 0.55% cyanogen, respectively, representing a cyanogen yield of about 40–50% per pass based on the ozone input. When this run is repeated substituting 3 N $H_3PO_4$ for the sulfuric acid similar yields of cyanogen are obtained. When this reaction is carried out in aqueous solution, it is preferred that a 1–5 N mineral acid be used, although some cyanogen is obtained when the hydrogen cyanide is dissolved in water and reacted with ozone in the presence of a catalyst.

*Example III*

Oxygen, containing no ozone, was passed about 10 liters per hour, at 20° C., through a solution composed of 50 ml. liquid hydrogen cyanide and 200 ml. of 3 N $H_2SO_4$. The effluent gases were tested by the mass spectrometer and showed that no cyanogen was produced. When this experiment is repeated using $Cu_2Cl_2$ as catalysts, no cyanogen is obtained, using oxygen alone, at room temperature or at temperatures as high as 150° C.

*Example IV*

Gaseous hydrogen cyanide and oxygen containing 3.5% ozone were passed through a Pyrex tube containing copper foil as catalyst at a temperature of 28° C. and a gaseous hourly space velocity of reactants of about 400. The mol ratio of hydrogen cyanide to ozone was 6.5. In this experiment 14.1% of the hydrogen cyanide was consumed in a single pass through the reactor and produced cyanogen in an ultimate yield of 35.3%, based on the hydrogen cyanide consumed. This yield is calculated from the equation

$$2HCN + O_3 \rightarrow (CN)_2 + H_2O + O_2$$

*Example V*

Gaseous hydrogen cyanide and oxygen containing about 3.5% ozone were passed through an aqueous slurry of cuprous chloride at 28° C. and at a gaseous hourly space velocity of 800. The mol ratio of hydrogen cyanide to ozone was 5.9. In this experiment 20.4% of the hydrogen cyanide was consumed in a single pass through the reactor. Cyanogen was obtained in an ultimate yield of 24.4% based on the hydrogen cyanide consumed in the reaction.

*Example VI*

Gaseous hydrogen cyanide and oxygen containing about 3.5% ozone were passed through a Pyrex tube containing ¼″ pellets of cuprous chloride. The reactants were fed at a gaseous hourly space velocity of 850 at a hydrogen cyanide/ozone mol ratio of 6.1. The temperature of the reaction zone at the beginning of the reaction was 78° C. The temperature rose to 117° C. during the course of the reaction due to the highly exothermic nature of this reaction. In this experiment 28.1% of the hydrogen cyanide was consumed in a single pass through the reactor. Cyanogen was obtained in an ultimate yield of 31.6% based on the hydrogen cyanide consumed in the reaction.

*Example VII*

The experiment of Example VI was repeated using the same catalyst, flow rate, and proportion of reactants. However, in this experiment the initial reaction temperature was 157° C. The reaction became highly exothermic and the temperature in the reaction zone increased to 350° C. in the course of this reaction. In this reaction 99% of the hydrogen cyanide was consumed. However, only 9.4% cyanogen was obtained, the balance of the hydrogen cyanide having been converted to carbon dioxide and water. It is thus apparent that the upper practical limit for this reaction is about 150° C.

In a number of additional experiments hydrogen cyanide-ozone mixtures were contacted with various materials which were hoped to have catalytic activity in promoting the oxidation of hydrogen cyanide to cyanogen. In these experiments, the following catalysts were tested and found to be inactive in promoting the oxidation of hydrogen cyanide:

(1) $H_3PO_4$ on kieselguhr at room temperature.
(2) Sulfur dioxide gas at room temperature.
(3) Sulfur dioxide and water at room temperature.
(4) A mixture of $H_2SO_4$, $H_3PO_4$, and water on glass wool at room temperature.
(5) Dilute sulfuric acid solution at room temperature.
(6) Concentrated phosphoric acid at room temperature.
(7) Silver on pumice at 59° and 107° C., respectively.

From the foregoing experiments, it appears that hydrogen cyanide and ozone are reacted in the presence of copper metal or cuprous compounds, as catalysts in liquid phase, in gas phase, or in solution in the temperature range from about −14° to +150° C.

While we have described our invention fully and completely, with special emphasis upon several preferred embodiments thereof, as required by the patent laws, we wish it understood that within the scope of the appended claims this invention may be practiced otherwise than as specifically described herein.

What is claimed is:

1. A process for preparing cyanogen which comprises contacting hydrogen cyanide with ozone at a temperature of about −14° to +150° C. in the presence of a copper-containing catalyst to oxidize the hydrogen cyanide to cyanogen, and recovering the cyanogen-containing reaction effluent.

2. The process of claim 1 in which hydrogen cyanide is contacted in the gaseous state with an ozone-containing gas of a group consisting of ozonized oxygen and ozonized air in a reaction zone, cyanogen and water vapor are separated from the reaction effluent, and substantially cyanogen-free and water-free hydrogen cyanide is recycled for further contact with the ozone-containing gas.

3. The process of claim 1 in which the catalyst is copper metal.

4. The process of claim 1 in which the catalyst is cuprous chloride.

5. The process of claim 1 in which the hydrogen cyanide is added in a 1–5 normal mineral acid aqueous solution.

6. The process of claim 5 wherein said acid solution is sulfuric 1–5 normal acid containing in solution 10–50% by volume of hydrogen cyanide.

7. The process of claim 5 wherein said acid solution is phosphoric 1–5 normal acid containing in solution 10–50% by volume of hydrogen cyanide.

8. The process of producing cyanogen which comprises the steps of ozonizing a gas of the class consisting of oxygen and air between electrically-charged plates in an ozonizing zone, contacting hydrogen cyanide-containing liquid at about −14° to +78° C. with said ozonized gas in a reaction zone containing a copper-containing catalyst, passing resultant reaction effluent to a condensing zone and therein condensing hydrogen cyanide, returning said condensed hydrogen cyanide to said reaction zone, and removing uncondensed cyanogen-containing effluent from said condensing zone and recovering cyanogen therefrom.

9. The process of claim 8 in which the catalyst is copper metal.

10. The process of claim 8 in which the catalyst is cuprous chloride.

References Cited in the file of this patent

UNITED STATES PATENTS

| | | |
|---|---|---|
| 1,961,878 | Gilkey | June 5, 1934 |
| 2,841,472 | Fierce et al. | July 1, 1958 |

OTHER REFERENCES

Sidgewick: "The Chemical Elements and Their Compounds," The Oxford University Press, London, vol. II, 1950, p. 860.